United States Patent
Choi et al.

(10) Patent No.: US 9,681,347 B2
(45) Date of Patent: Jun. 13, 2017

(54) METHOD AND APPARATUS FOR DETERMINING ENERGY-SAVING COMPENSATION CELL IN SMALL CELL-BASED WIRELESS ACCESS SYSTEM

(71) Applicant: LG ELECTRONICS INC., Seoul (KR)

(72) Inventors: Hyeyoung Choi, Seoul (KR); Jaehoon Chung, Seoul (KR); Eunjong Lee, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/770,772

(22) PCT Filed: Mar. 10, 2014

(86) PCT No.: PCT/KR2014/001954
§ 371 (c)(1),
(2) Date: Aug. 26, 2015

(87) PCT Pub. No.: WO2014/142491
PCT Pub. Date: Sep. 18, 2014

(65) Prior Publication Data
US 2016/0014661 A1 Jan. 14, 2016

Related U.S. Application Data

(60) Provisional application No. 61/775,665, filed on Mar. 10, 2013.

(51) Int. Cl.
*H04W 36/16* (2009.01)
*H04W 52/02* (2009.01)

(52) U.S. Cl.
CPC ....... *H04W 36/16* (2013.01); *H04W 52/0206* (2013.01); *Y02B 60/50* (2013.01)

(58) Field of Classification Search
None
See application file for complete search history.

(56) References Cited

U.S. PATENT DOCUMENTS

2011/0237239 A1 9/2011 Chou et al.
2012/0289178 A1 11/2012 Matsumura et al.
(Continued)

FOREIGN PATENT DOCUMENTS

| KR | 10-2010-0048834 | 5/2010 |
| KR | 10-2012-0113779 | 10/2012 |
| WO | WO20120927876 | * 1/2012 |

OTHER PUBLICATIONS

Bell, "Energy saving solutions for inter-eNB scenario," 3GPP TSG-RAN WG3 #75, R3-120273, Feb. 2012, 5 pages.
(Continued)

*Primary Examiner* — Mohammad Adhami
(74) *Attorney, Agent, or Firm* — Lee Hong Degerman Kang & Waimey

(57) ABSTRACT

According to one embodiment of the present invention, a method for determining an energy-saving (ES) compensation cell in a wireless access system comprises: a step of transmitting an ES compensation candidate request message to confirm whether the ES compensation state can be changed from a first base station to a second base station; a step of receiving, from the second base station, an ES compensation candidate response message for indicating the switch to the ES compensation state; a step of receiving, from the second base station, an ES candidate cell indicator message including an ES state cell list for indicating third base stations to be additionally switched to the ES state; and
(Continued)

a step of determining the ES compensation cell on the basis of the ES compensation candidate response message and the cell list.

14 Claims, 11 Drawing Sheets

(56) References Cited

U.S. PATENT DOCUMENTS

| | | | | |
|---|---|---|---|---|
| 2013/0286917 A1* | 10/2013 | Jia | ...................... | H04W 52/0206 370/311 |
| 2014/0018057 A1* | 1/2014 | Yu | ...................... | H04W 52/0206 455/418 |
| 2014/0018077 A1* | 1/2014 | Zhong | ............... | H04W 52/0206 455/436 |

OTHER PUBLICATIONS

CATT, "The solution for the compensation scenario," 3GPP TSG-RAN WG3 #75, R3-120512, Feb. 2012, 5 pages.

European Patent Office Application Serial No. 14763829.0, Search Report dated Aug. 19, 2016, 7 pages.

PCT International Application No. PCT/KR2014/001954, Written Opinion of the International Searching Authority dated Jun. 26, 2014, 15 pages.

PCT International Application No. PCT/KR2014/001954, Written Opinion of the International Searching Authority dated Jun. 26, 2014, 11 pages.

* cited by examiner (a) Control-Plane Protocol Stack (b) User-Plane Protocol Stack MeNB : Macro eNB B    MUE : Macro UE
PeNB : Pico eNB       PUE : Pico UE
FeNB : Femto eNB      FUE : Femto UE Peak Traffic Situation          Off-Peak Traffic Situation
         (a)                              (b)

METHOD AND APPARATUS FOR DETERMINING ENERGY-SAVING COMPENSATION CELL IN SMALL CELL-BASED WIRELESS ACCESS SYSTEM

CROSS-REFERENCE TO RELATED APPLICATIONS

This application is the National Stage filing under 35 U.S.C. 371 of International Application No. PCT/KR2014/001954, filed on Mar. 10, 2014, which claims the benefit of U.S. Provisional Application No. 61/775,665, filed on Mar. 10, 2013, the contents of which are all hereby incorporated by reference herein in their entirety.

TECHNICAL FIELD

The present invention relates to a small cell-based wireless access system, a method and apparatus for determining an Energy Saving (ES) compensation cell for an on/off small cell which is powered on/off dynamically.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

The configurations of wireless access networks have recently been changed in such a manner that various types of small cells having small sizes (e.g., micro cells, pico cells, femto cells, etc.) interact with a macro cell having a relatively large size. This aims to increase Quality of Experience (QoE) by providing a high data rate to an end User Equipment (UE) in a situation where hierarchical multi-layer cells basically involving legacy macro cells co-exist.

According to Small Cell Enhancements for E-UTRA and E-UTRAN SI (refer to RP-122033), which is one of the current 3rd Generation Partnership Project (3GPP) standardization categories, discussion is under way to enhance indoor/outdoor scenarios using low power nodes, under the subject of small cell enhancement. Scenarios and requirements for small cell enhancement are disclosed in the 3GPP TR 36.932 standard.

Considering this trend, end UEs will be physically closer to a network in view of deployment of a large number of small cells within a macro cell. Therefore, it is expected that not legacy physical cell-based communication but UE-centered zone-based communication will be conducted in a future-generation wireless access network. To enable communication in a UE-centered zone for increasing capacity, technical issues should be induced and solved to realize a service providing unit such as a UE-centered zone differentiated from a legacy physical cell.

The emergence of small cells may significantly affect a current Remote Area Network (RAN). Particularly, the on/off characteristics of a small cell may affect deployment of a macro cell in terms of energy saving.

DISCLOSURE

Technical Problem

An object of the present invention devised to solve the problem is to provide a method for efficiently managing the power of a small cell in a small-cell environment.

Another object of the present invention is to provide methods for determining a compensation cell that compensates the coverage of an on/off cell, if the on/off cell is dynamically powered on/off.

Another object of the present invention is to provide a method for minimizing interference with an adjacent cell, which is caused by power increase/decrease when a small cell is powered on/off.

Another object of the present invention is to provide apparatuses supporting the above methods.

The objects achieved by the present invention are not limited to the above-described objects and those skilled in the art may consider other objects from the following description of the embodiments of the present invention

Technical Solution

The present invention relates to a small cell-based wireless access system, and particularly, to a method and apparatus for determining an ES compensation cell for an on/off small cell, when the small cell is dynamically powered on/off.

In an aspect of the present invention, provided herein is a method for determining an Energy Saving (ES) compensation cell in a wireless access system. The method includes transmitting an ES compensate candidate request message to a second Base Station (BS) to determine whether the second BS is capable of transitioning to an ES compensation state by a first BS, receiving from the second BS an ES compensate candidate response message indicating that the second BS is to transition to the ES compensation state by the first BS, receiving from the second BS an ES candidate cell indicator message including an ES state cell list listing third BSs that are to additionally transition to an ES state by the first BS, and determining the ES compensation cell based on the ES compensate candidate response message and the ES state cell list by the first BS. The first BS is an on/off cell that is to transition to the ES state.

The method may further include transmitting an ES compensate cell(s) indicator message including timer information indicating an ES compensate state transition time point to indicate the determined ES compensation cell by the first BS, receiving from the ES compensation cell an ES compensate complete indicator message indicating completion of transitioning to the ES compensation state by the first BS, and transitioning to the ES state after receiving the ES compensate complete indicator message by the first BS.

The ES compensate complete indicator message may include timer information indicating an ES state transition time point, and the first BS may transition to the ES state before expiration of the timer information.

The method may further include transmitting an ES state transition message commanding one or more User Equipments (UEs) within a cell area of the first BS to perform handover to the ES compensation cell after receiving the ES compensate complete indicator message by the first BS.

The ES candidate cell indicator message may further include an ES compensation cell list listing one or more fourth BSs that are additionally to transition to the ES compensation state, and the first BS may determine the ES compensation cell based on the ES state cell list and the ES compensation cell list.

The first BS, the second BS, a third BS, and the one or more fourth BSs may be small cells included in one small cell cluster.

Or the second BS may be a BS adjacent to the first BS, the third BS may be a BS adjacent to the second BS, and the one or more fourth BSs may be BSs adjacent to the third BS.

In another aspect of the present invention, a first BS for determining an ES compensation cell in a wireless access system includes a transmitter, a receiver, and a processor configured to determine the ES compensation cell.

The processor may be configured to transmit an ES compensate candidate request message to a second BS to determine whether the second BS is capable of transitioning to an ES compensation state by controlling the transmitter, to receive from the second BS an ES compensate candidate response message indicating that the second BS is to transition to the ES compensation state by controlling the receiver, to receive from the second BS an ES candidate cell indicator message including an ES state cell list listing third BSs that are to additionally transition to an ES state by controlling the receiver, and to determine the ES compensation cell based on the ES compensate candidate response message and the ES state cell list by the first BS. The first BS may be an on/off cell that is to transition to the ES state.

The processor may be configured to transmit an ES compensate cell(s) indicator message including timer information indicating an ES compensate state transition time point to indicate the determined ES compensation cell by controlling the transmitter, and to receive from the ES compensation cell an ES compensate complete indicator message indicating completion of transitioning to the ES compensation state by controlling the receiver. The first BS may transition to the ES state after receiving the ES compensate complete indicator message.

The ES compensate complete indicator message may include timer information indicating an ES state transition time point, and the first BS may transition to the ES state before expiration of the timer information.

The processor may be configured to transmit an ES state transition message commanding one or more UEs within a cell area of the first BS to perform handover to the ES compensation cell after receiving the ES compensate complete indicator message.

The ES candidate cell indicator message may further include an ES compensation cell list listing one or more fourth BSs that are additionally to transition to the ES compensation state, and the first BS may determine the ES compensation cell based on the ES state cell list and the ES compensation cell list.

The first BS, the second BS, a third BS, and the one or more fourth BSs may be small cells included in one small cell cluster.

The second BS may be a BS adjacent to the first BS, the third BS may be a BS adjacent to the second BS, and the one or more fourth BSs may be BSs adjacent to the third BS.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First, the power of a small cell can be managed efficiently in a small-cell environment.

Secondly, if an on/off cell is dynamically powered on/off in a small-cell environment, a compensation cell can be efficiently determined, which compensates the coverage of the on/off cell.

Thirdly, interference that a small cell causes to an adjacent cell due to power increase or decrease during an on/off operation can be minimized.

The effects of the present invention are not limited to the above-described effects and other effects which are not described herein will be understood by those skilled in the art from the following description of the embodiments of the present invention. That is, unintended effects of the present invention may be also derived by those skilled in the art from the embodiments of the present invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5(a) illustrates a peak traffic environment and FIG. 5(b) illustrates an off-peak traffic environment;

BEST MODE

Figure 1:
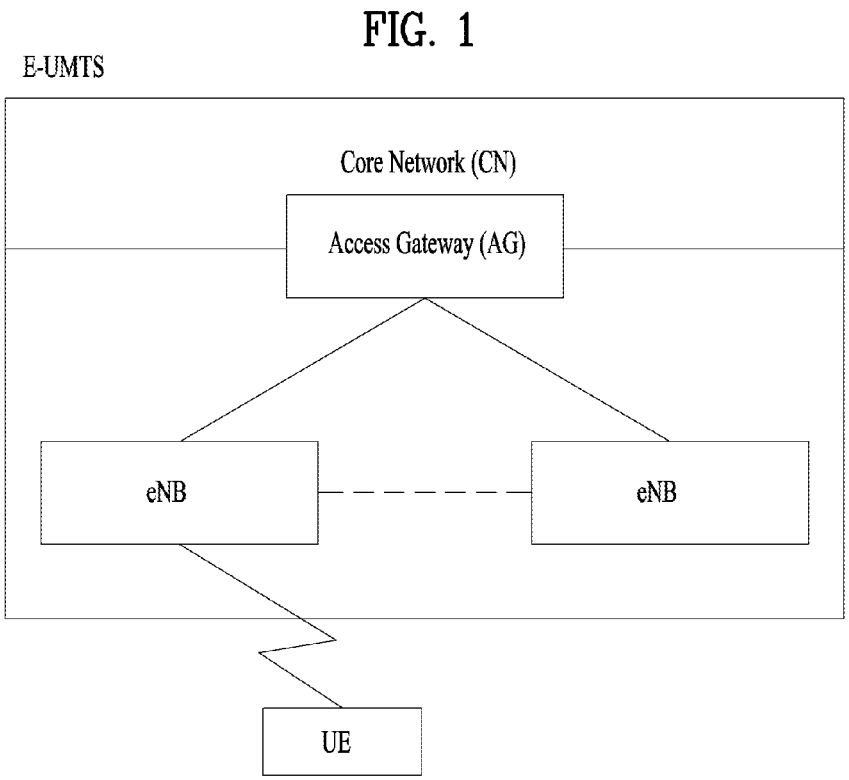
FIG. 1 illustrates a network configuration of an Evolved Universal Mobile Telecommunication System (E-UMTS)

Embodiments of the present invention relate to a method and apparatus for dynamically controlling the power of a small cell in a small cell-based network system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

When it is said that a part 'comprises' or 'includes' a component through the specification, this means that unless otherwise specified, the part may further include another component, not excluding another component. In addition, the term 'unit', '-er(or)', or 'module' signifies a unit of processing at least one function or operation. This may be implemented in hardware, software, or a combination of them. 'a' or 'an', 'one', 'the', and their similar terms may include both singular and plural expressions, unless otherwise specified or clearly indicated in the context of the present invention (particularly, in the context of the appended claims).

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term "Base Station (BS)" may be replaced with the terms fixed station, Node-B, eNode-B (eNB), advanced base station (ABS), a macro cell, a small cell, or access point as necessary.

The term "terminal" may also be replaced with the term user equipment (UE), mobile station (MS), subscriber station (SS), mobile subscriber station (MSS), mobile terminal or advanced mobile station (AMS) as necessary.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The following embodiments of the present invention can be applied to a variety of wireless access systems, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMax), IEEE 802-20, and E-UTRA (Evolved UTRA).

The UTRA is a part of the UMTS (Universal Mobile Telecommunications System). UMTS is a 3G asynchronous mobile communication system operating in WCDMA, GSM, and GPRS. 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on the 3GPP LTE and LTE-A systems. However, the technical feature of the present invention are not limited thereto. The specific terms used in the following description are provided in order to facilitate the understanding of the present invention and may be changed in other forms without departing from the technical scope of the present invention.

For example, 'cell' as described in the embodiments of the present invention may basically include downlink resources and optionally, uplink resources. Linkage between a carrier frequency for the downlink resources and a carrier frequency for the uplink resources is specified in System Information (SI) transmitted in downlink resources.

A small cell cluster may be defined as a group of small cells each covering a dense traffic area (e.g., a hotspot).

Unless otherwise defined, messages having the same name are configured in the same message format and includes fields or parameters that execute the same functions.

1. 3GPP LTE/LTE-A System
1.1 LTE/LTE-A Network Structure

Hereinafter, 3GPP LTE (3rd Generation Partnership Project Long Term Evolution; hereinafter called "LTE") system which is one of mobile communication systems is described.

FIG. 1 illustrates a network configuration of an Evolved Universal Mobile Telecommunication System (E-UMTS).

An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs. A Core Network (CN) may include the AG and a network node or the like for user registration of UEs.

An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
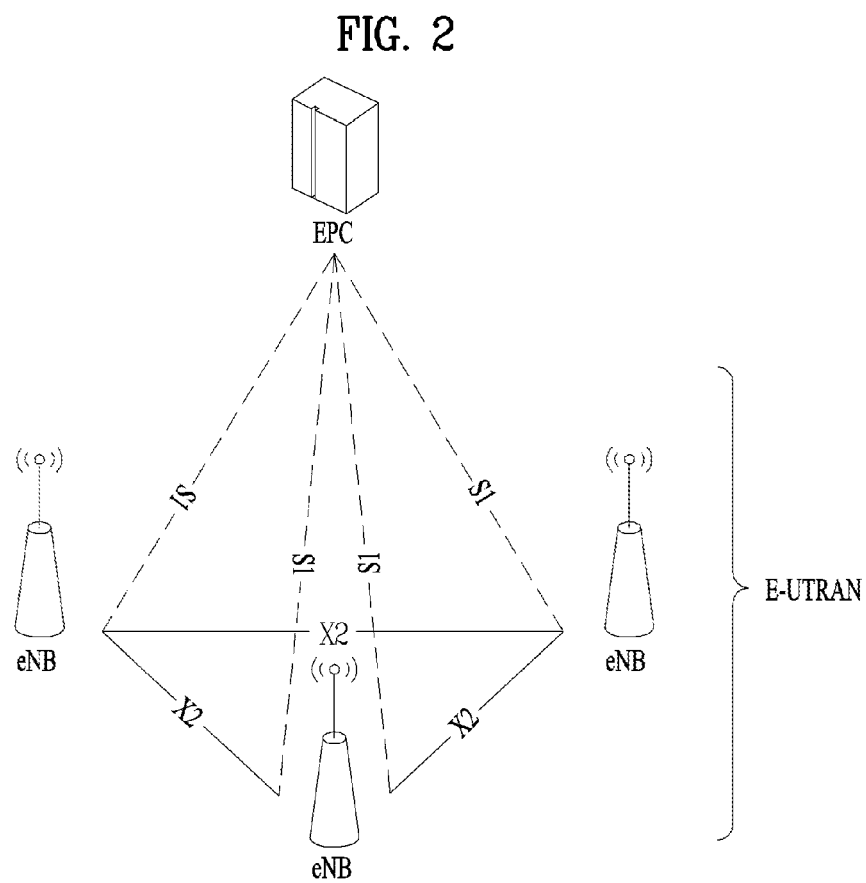
FIG. 2 illustrates a network configuration of an Evolved Universal Terrestrial Radio Access Network (E-UTRAN)

FIG. 2 illustrates a network configuration of an Evolved Universal Terrestrial Radio Access Network (E-UTRAN).

The E-UTRAN system is an evolved version of the conventional UTRAN system. The E-UTRAN includes base stations that will also be referred to as "eNode Bs" or "eNBs". The eNBs are connected through X2 interfaces. The X2 user plane interface (X2-U) is defined between eNBs. The X2-U interface provides non guaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipments (UEs) through a radio interface and is connected to an Evolved Packet Core (EPC) through an S1 interface. The S1 user plane interface (S1-U) is defined between the eNB and the S-GW. The S1-U interface provides non guaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

Figure 3:
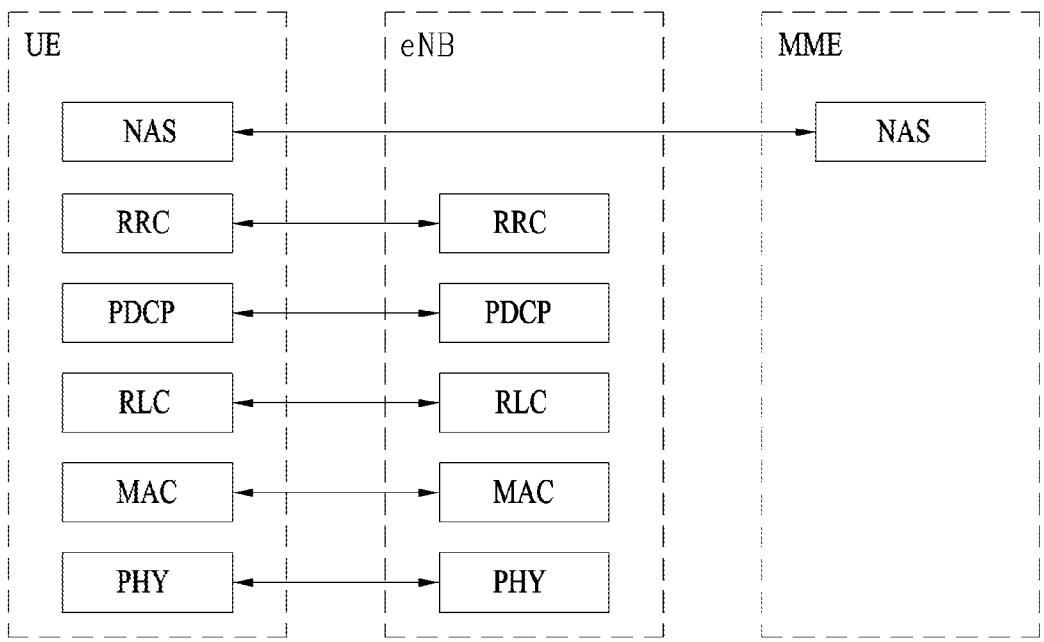
FIG. 3 illustrates a control-plane protocol stack and a user-plane protocol stack in a radio interface protocol architecture conforming to a $3^{rd}$ Generation Partnership Project (3GPP) radio access network standard between a User Equipment (UE) and an E-UTRAN.
Figure 3:
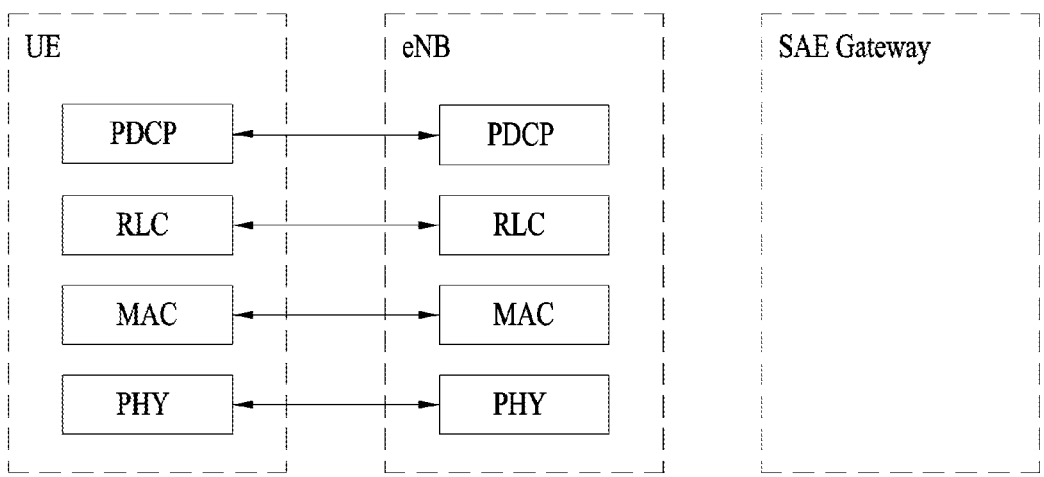

FIG. 3 illustrates a control-plane protocol stack and a user-plane protocol stack in a radio interface protocol architecture conforming to a 3$^{rd}$ Generation Partnership Project (3GPP) radio access network standard between a User Equipment (UE) and an Evolved UMTS Terrestrial Radio Access Network (E-UTRAN).

Referring to FIG. 3, the radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Heterogeneous Network Deployment

Figure 4:
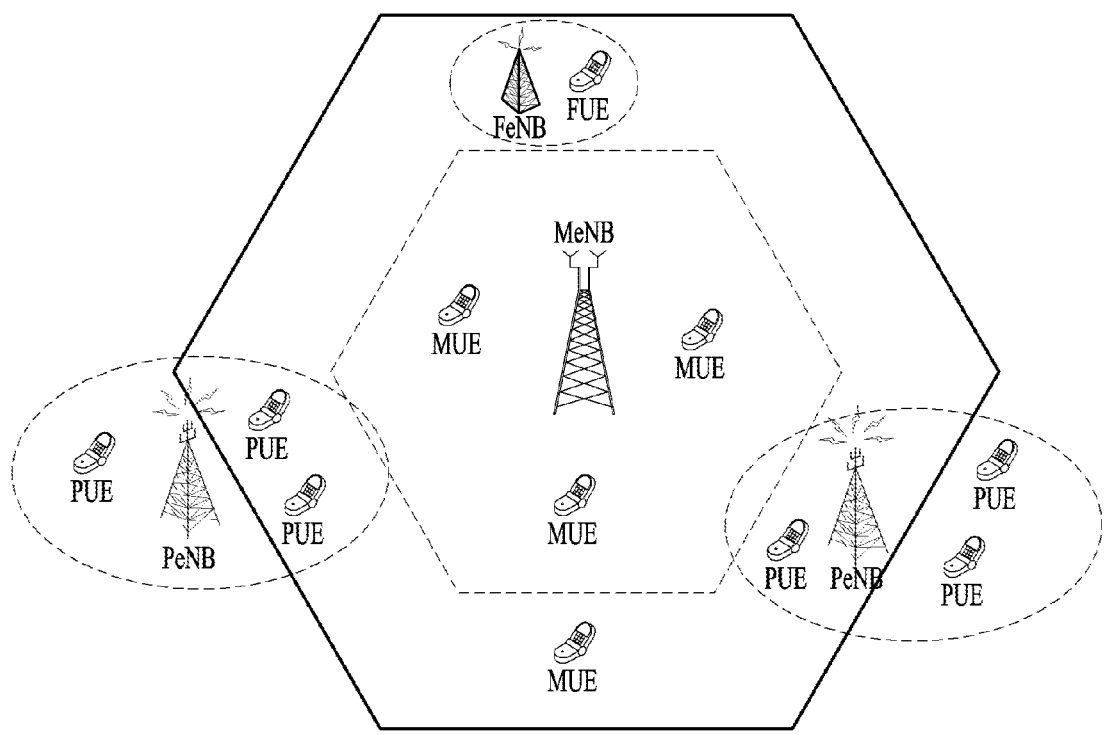
FIG. 4 illustrates exemplary deployment of a heterogeneous network.

FIG. 4 illustrates an example of heterogeneous network deployment.

To stably ensure data service such as multimedia data in a future-generation mobile communication system, more interest has been attracted to the introduction of a hierarchical cell structure or heterogeneous cell structure in which pico cells, femto cells and/or micro cells as a small cell for low-power/short-range communication are co-existent in a macro cell-based homogeneous network.

Adding macro cells to a conventional eNB deployment is inefficient in terms of cost and complexity relative to improved system performance. A heterogeneous network under consideration for a current communication network is configured as illustrated in FIG. 4.

In FIG. 4, an eNode B that manages and covers a macro cell is defined as a Macro eNode B (MeNB) and a UE operating within a macro cell managed by an MeNB is defined as a Macro UE (MUE). Further, an eNode B that manages and covers a pico cell is defined as a Pico eNode B (PeNB) and a UE operating within a pico cell managed by a PeNB is defined as a Pico UE (PUE). An eNode B that manages and covers a femto cell is defined as a Femto eNode B (FeNB) and a UE operating within a femto cell managed by an FeNB is defined as a Femto UE (FUE).

Referring to FIG. 4, a plurality of micro cells may be co-existent in one macro cell. The micro cells are allocated resources by cell coordination and service UEs using the resources. These micro cells are categorized into two types depending on their access schemes.

(1) Open access Subscriber Group (OSG): an OSG-type micro cell is accessible to legacy MUEs or other micro UEs. Handover to the OSG-type micro cell or a macro cell is possible.

(2) Close access Subscriber Group (CSG): a CSG-type micro cell does not allow access from legacy MUEs or other micro UEs without authentication. Therefore, handover to the CSG-type micro cell or a macro cell is impossible.

1.3 Energy Saving (ES) State

Protecting the environment and combating climate change are challenges that we face today. In the telecom environment, as energy prices increase, there is added incentive for Network Operators to look for means to reduce energy costs.

OAM of mobile networks can contribute to energy saving by allowing the operator to set policies to minimize consumption of energy, while maintaining coverage, capacity and quality of service. The permitted impact on coverage, capacity and quality of service is determined by operator's policy.

When a cell is in energy saving states, it may need neighboring cells to pick up the load. However a cell in Energy Saving state cannot cause coverage holes or create undue load on the surrounding cells. All traffic on that cell is expected to be drained to other overlaid/umbrella cells before any cells moves to Energy Saving state.

A cell in Energy Saving state is not considered a cell outage or a fault condition. No alarms should be raised to the IRP Manager for any condition that is a consequence of a UE moving into Energy Saving state. In addition, the use of the renewable energy sources (e.g. wind, solar energy) should be encouraged in mobile networks.

The following ESM concepts can apply to different RATs, e.g. UMTS and LTE/LTE-A system. Nevertheless some of these ESM concepts may be limited to specific RATs and network elements, and specific solutions may be required for them.

Figure 5:
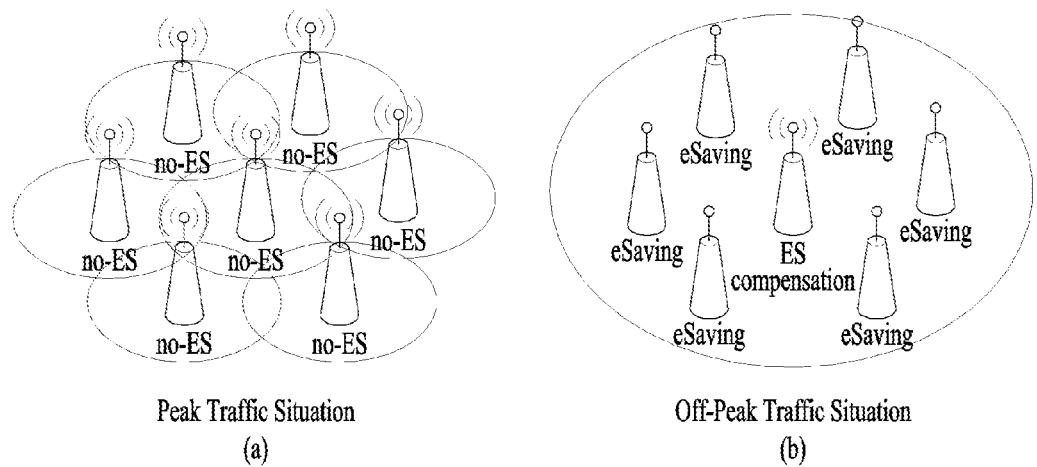
FIG. 5 illustrates exemplary deployment of a network according to various throughput requirements for the purpose of energy saving.

FIG. 5 illustrates exemplary deployment of a network according to various throughput requirements for the purpose of energy saving. Specifically, FIG. 5(a) illustrates a peak traffic environment and FIG. 5(b) illustrates an off-peak traffic environment.

Referring to FIG. 5(a), the coverage area of a cell can be configured dynamically, where an operator would employ smaller coverage areas per cell (to increase capacity per geographic area) in a peak traffic situation.

In that case some base stations would be enabled to adjust their transmission power and other configuration parameters for their cells at off-peak times in order to provide coverage for other neighboring cells—which could then be transferred to energy saving state, after handing currently associated UEs over to remaining neighboring cells.

Activating energy saving on certain base stations and modifying radio parameters for increasing coverage for other cells can lead to different neighbor relations as well as different cell and frequency layouts, which should be addressed by automatic neighbor relation, interference control, e.g. through OAM-driven configuration or SON functions, depending on the specific RAT in use. Depending on the specific scenarios, activating energy saving on base stations could ultimately lead to switching off all radio-transmission-related functions at a site, which would lead to reduced energy consumption and could implicitly lead to even further energy saving, e.g. when air condition systems at a site adapt to the reduced cooling requirements—which is not considered here in detail.

The energy saving management in the scenario would ideally lead to situation for an off-peak time as depicted in FIG. 5(b)—where one base station would remain powered one (depicted as ES-Compensate), taking over the coverage areas of neighbor base stations in Energy Saving state (depicted as eSaving).

As another network arrangement, we can consider a eNB overlaid use vase. In order to assure the service connectivity and make no side effect on the service (there is a possible case that a UE may power on in the area of an eNB in ES), only the eNB overlaid by other eNBs (i.e. the area served by the eNB also covered by other eNBs) can enter into ES.

In this scenario, legacy systems (e.g. 2G/3G systems) provide radio coverage together with E-UTRAN. Another case similar with this is that an area covered by different frequencies in E-UTRAN, i.e. inter-frequency case.

According to the definition of base station classes, base stations can be categorized by Macro Cell (Wide Area Base Station), Micro Cell (Medium Range Base Station), Pico Cell (Local Area Base Station) and Femto Cell (characterized by Home Base Station). This category of base station can be applied to enhance the scenarios of inter-frequency eNB overlaid.

2. Dynamic Cell On/Off

A cell may be powered on/off in consideration of the load of the cell or the like in order to save energy or coordinate/cancel interference. For example, a different network load is observed at a specific time in a specific space, and a signal (e.g., a synchronization signal or a reference signal) transmitted from a load-free cell consumes energy and interferes with a neighbor cell. Accordingly, if a cell has little load or no load, the cell may be powered on/off for the purpose of ES and interference coordination/cancellation.

The meaning of "Power-off" of a cell may cover both complete power-off of a specific function of the cell or a network element and restriction of use of some radio resources. In other words, the range of powering off a cell does not being limited in the embodiments of the present invention.

If the cell is powered off operatively, the cell may not perform one or either of DL signal transmission and UL signal reception. For example, a DL signal may be transmitted, whereas a UL signal may not be received.

The meaning of "Power-on" of a cell may cover both complete power-on of a specific function of the cell or a network element and allowed use of some radio resources.

If the cell is powered on operatively, the cell may perform one or both of DL signal transmission and UL signal reception. For example, a DL signal may be transmitted, whereas a UL signal may not be received.

Obviously, power-on or power-off of a cell as described in the embodiments of the present invention may be performed irrespective of DL/UL signal transmission/reception. The term cell as used in the embodiments of the present invention may cover macro cell and small cell (e.g., micro cell, pico cell, femto cell, etc.).

Power-on/off of a cell may significantly affect inter-cell interference and the frequency with which the cell is powered on/off may lead to great interference fluctuation. Particularly when cells are densely populated or a specific cell uses the same frequency band as its adjacent cells, inter-cell interference may become severe.

For example, if a specific cell is powered on, its adjacent cells using the same frequency as the specific cell may receive more severe interference from the specific cell. As cells are more densely located in the vicinity of the specific cell, using the same frequency as the specific cell, power-on of the specific cell causes more severe interference to the adjacent cells. Further, if the specific cell is powered off, the interference may be mitigated for the adjacent cells using the same frequency as the specific cell.

If a cell is powered on/off through power control, the energy of the cell may be saved. However, since the cell on/off may cause severe interference to other adjacent cells, the influence of the power-on/off on the adjacent cells as well as the specific cell should be considered.

Further, when the cell is powered on/off, an adjacent cell that will compensate the coverage of the cell should be determined This is done because without the compensating adjacent cell, the cell area of the cell may become a coverage hole.

Accordingly, the embodiments of the present invention provide a method for determining adjacent cells that will compensate the coverage of an on/off cell, when the cell intending to transition to the ES state is powered on/off.

2.1 On/Off Cell and Compensation Cell

In the embodiments of the present invention, a cell that is powered on or off to transition to the ES state may be defined as an on/off cell, an ES cell, a first cell, or a first eNB. A cell that will compensate the coverage of the on/off cell may be defined as a compensation cell, an ES compensation cell, a second cell, or a second eNB. Further, when small cells form a cluster, a cell that will coordinate with a macro cell (i.e., a small cell cluster header) may be defined.

When an on/off cell and a compensation cell are deployed, the cells may be configured by O & M, a macro cell or a network, or a distribution method with adjacent small cells. Information about the small cell configuration may be exchanged during formation of a backhaul between cells or by signaling with other cells for dynamic cell on/off.

In a capacity-limited network use case, if one or more on/off cells are powered off, adjacent compensation cells may transition to an ES compensation state in order to cover the service coverage of the on/off cells. Herein, the power of the on/off cells transitioning to the ES state and the compensation cells transitioning to the ES compensation state may be controlled in one or more steps.

In the case of one-step power control, the compensation cells adjacent to the on/off cells transition to the ES compensation state before the on/off cells are powered off and transition to the ES state, so that the compensation cells may cover the coverage areas of the on/off cells. Then, the on/off cells are transitioned to the ES state.

In the case of multi-step power control, the coverage areas of the on/off cells may be covered gradually by controlling the power of the on-off cells and the compensation cells in multiple steps. That is, if the on/off cells are powered off, certain parts of the coverage areas of the on/off cells are covered by the compensation cells that have transitioned to the ES compensation state and the power of the on/off cells may also be decreased gradually.

If small cells are densely deployed, a centralized scheme may be considered, in which a central controller controls operations of on/off cells and compensation cells. However, load information about all cells should be transmitted to the controller in the centralized scheme. As a result, signal overhead, network load, and complexity may be increased. Moreover, a non-ideal backhaul or no backhaul may be configured between a macro cell and a small cell and between small cells. Therefore, the centralized scheme may not guarantee against latency during network coordination and may cause a macro cell or a network not to control all small cells. That is, when a small cell is dynamically powered on/off for saving the energy of the network, an area to be controlled/adjusted due to on/off of the small cell may be limited in consideration of the coverage of the small cell.

Accordingly, a description will be given below of methods for determining an on/off cell and a compensation cell between eNBs in a distributed manner.

2.2 One-Step Power Control Methods

Figure 6:
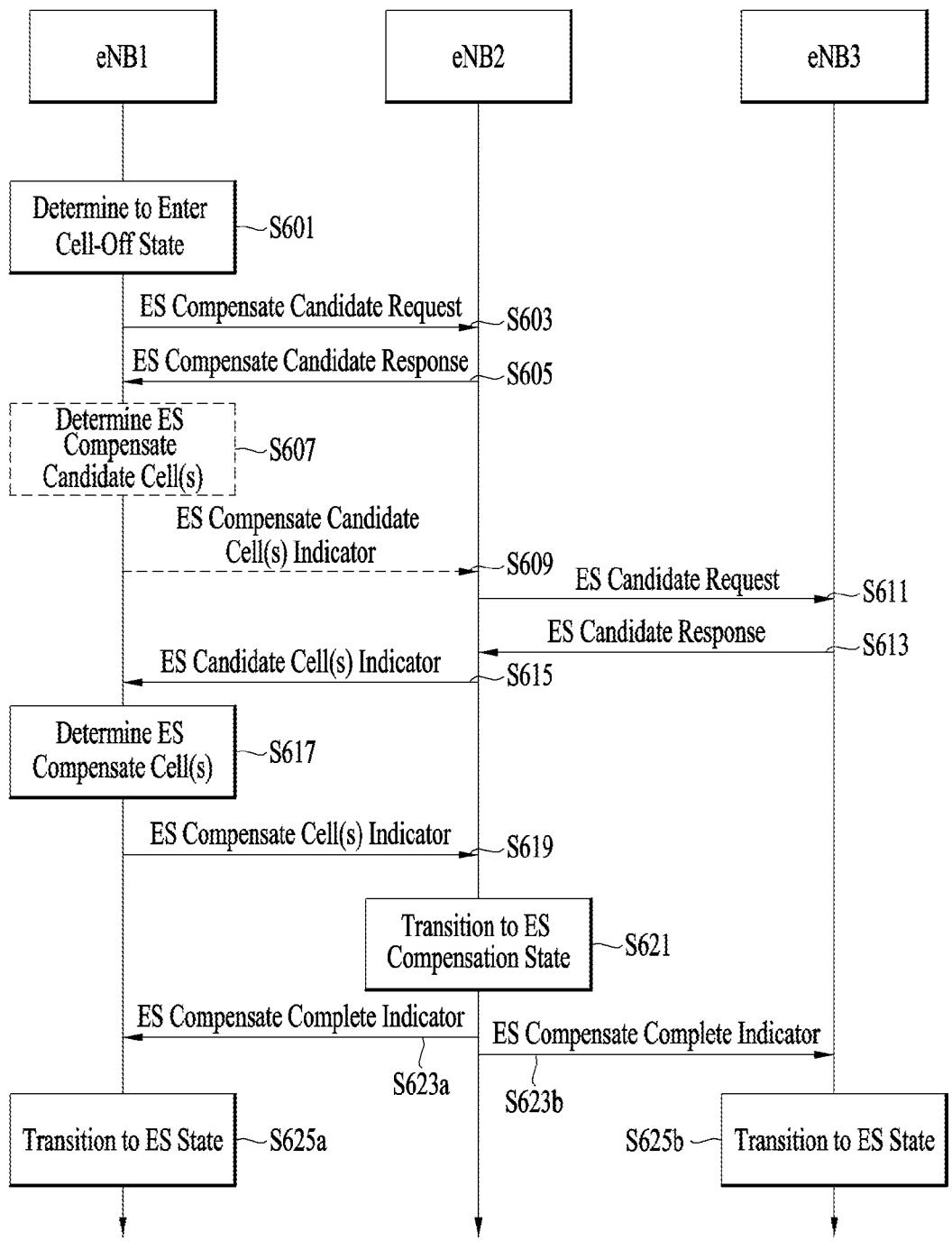
FIG. 6 illustrates one of methods for determining a compensation cell by an on/off cell, as a one-step power control method.

FIG. 6 illustrates one of methods for determining a compensation cell by an on/off cell, as a one-step power control method.

In FIG. 6, it is assumed that a first eNB (eNB1) is an on/off cell that will be powered off, and second and third eNBs (eNB2 and eNB3) form a small cell cluster together with eNB1. That is, eNB2 and/or eNB3 may be an ES compensation cell or an on/off cell. While a single second eNB and a single third eNB are shown in FIG. 6, a plurality of second eNBs and a plurality of third eNBs may be used.

If there is little or no load in a corresponding cell, eNB1 being an on/off cell may determine cell off, that is, to enter the ES state (S601).

To determine ES compensation candidate cells capable of transitioning to the ES compensation state, eNB1 may transmit an ES compensate candidate request message to neighbor cells of eNB1, a small cell cluster to which eNB1 belongs, or pre-defined cells of a small cell cluster. In FIG. 6, eNB1 transmits the ES compensate candidate request message to its adjacent eNB, eNB2 (S603).

In step S603, the ES compensate candidate request message may include a message type field (i.e., an indicator indicating the ES compensate candidate request message), a cell ID of a source eNB, a cell ID of a destination eNB, and load information about the source eNB.

Upon receipt of the ES compensate candidate request message, eNB2 checks its load state and transmits to eNB1 an ES compensate candidate response message as a response message indicating whether eNB2 is capable of operating as an ES compensation cell. That is, if eNB2 determines that it can compensate the cell of eNB1 by extending its cell to cover the cell coverage of eNB1, eNB2 may transmit the ES compensate candidate response message to eNB1 (S605).

In step S605, the ES compensate candidate response message may include a message type field (i.e., an indicator indicating the ES compensate candidate response message), a cell ID of a source eNB, and a cell ID of a destination eNB.

On the contrary, if eNB2 determines that it is not capable of compensating the cell of eNB1 after checking its load state, eNB2 may transmit an ES compensate candidate failure message in response to the ES compensate candidate request message in step S605. For example, if eNB2 is not capable of transitioning to the ES compensation state due to the capacity of eNB2 (i.e., if the maximum transmission power level of eNB2 is low) or eNB2 also determines to transition to the ES state, eNB2 may not transition to the ES compensation state.

The ES compensation candidate failure message may include a message type field (i.e., an indicator indicating the ES compensate candidate failure message), a cell ID of a source eNB, a cell ID of a destination eNB, and a cause field indicating the cause of compensation failure. That is, compensation failure causes may be mapped to specific values according to a predefined method and a corresponding specific value may be mapped to the cause field according to the predefined method.

eNB1 may determine whether there is a cell capable of transitioning to the ES compensation state by performing steps S603 and S605. Herein, eNB1 may determine all of one or more second eNBs transmitting ES compensate candidate response messages to be ES compensation candidate cells which are capable of transitioning to the ES compensation state. Or eNB1 may determine only cells satisfying a predefined condition from among one or more second eNBs transmitting ES compensate candidate response messages to be ES compensation candidate cells. For example, eNB1 may determine an eNB having the strongest signal or an eNB having a signal with a strength equal to or larger than a specific threshold to be an ES compensation candidate cell (S607).

eNB1 may transmit an ES compensate candidate cell(s) indicator message to one or more second eNBs determined to be ES compensation candidate cells, indicating that they are ES compensation candidate cells (S609).

The ES compensate candidate cell(s) indicator message may include a message type field (i.e., an indicator indicating the ES compensate candidate cell(s) indicator message), a cell ID of a source eNB, and a cell ID of a destination eNB. Steps S607 and S609 are optional.

eNB2 which has received the ES compensate candidate cell(s) indicator message in step S609 or eNB2 which has determined that it is capable of transitioning to the ES compensation state and has transmitted the ES compensate candidate response message after receiving the ES compensate candidate request message in step S603 may transmit an ES candidate request message to one or more third eNBs to determine whether there is any other on/off cell that will transition to the ES state in the vicinity of eNB2 (S611).

The one or more third eNBs may be neighbor cells of eNB2, small cells of a small cell cluster to which eNB2 belongs, or predefined small cells (e.g., indicated by configuration information of a macro cell) of a small cell cluster. The ES candidate request message may include a message type field (i.e., an indicator indicating the ES candidate request message), a cell ID of a source eNB, and a cell ID of a destination eNB.

In FIG. 6, eNB3 having little load or no load among the third eNBs that have received the ES candidate request message may determine to enter the ES state. This eNB3 transmits an ES candidate response message to eNB2 in response to the ES candidate request message in order to indicate that eNB3 will enter the ES state (S613).

The ES candidate response message may include a message type field (i.e., an indicator indicating the ES candidate response message), a cell ID of a source eNB, and a cell ID of a destination eNB.

In another aspect of the present invention, there may be cells that have determined not to transition to the ES state among the third eNBs that have received the ES candidate request message. These third eNBs may transmit ES candidate failure messages to eNB2, instead of ES candidate response messages in order to indicate that they will not enter the ES state in step S613.

Each of the ES candidate failure messages may include a message type field (i.e., an indicator indicating the ES candidate failure message), a cell ID of a source eNB, a cell ID of a destination eNB, and a cause filed indicating the cause of the ES state transition failure. The cause field may indicate much cell load, lack of capacity caused by dynamic cell on/off, and the like as ES state transition failure causes.

Upon receipt of the ES candidate response message, the ES compensation cell (i.e., eNB2) may transmit to eNB1 an ES candidate cell indicator message including information about the third eNBs that intend to enter the ES state (S615).

The ES candidate cell indicator message may include a message type field (i.e., an indicator indicating the ES candidate indicator message), cell IDs of cells that have transmitted ES candidate response messages (i.e., one or more third eNBs), a cell ID of a source eNB, and a cell ID of a destination eNB.

Upon receipt of the ES candidate cell indicator message, eNB1 may determine one or more ES compensation cells. For example, an ES compensation candidate cell having most third eNBs that intend to transition to the ES state near the ES compensation candidate cell among the ES compensation candidate cells (i.e., second eNBs) may be determined to be an ES compensation cell (S617).

Further, eNB1 transmits an ES compensate cell indicator message to one or more second eNBs determined to be ES compensation cells, indicating that the second eNBs have been determined to be ES compensation cells (S619).

The ES compensate cell indicator message may include a message type field (i.e., an indicator indicating the ES compensate cell indicator message), a cell ID of a source eNB, a cell ID of a destination eNB, timer information specifying a time point and a time period for transitioning the ES compensation cells to the ES compensation state, a power parameter required for power control of an ES compensation cell (e.g., a power value for the ES compensation cell), and an ES state cell list listing third eNBs that want to transition to the ES state.

Upon receipt of the ES compensate cell indicator message, eNB2 transitions to the ES compensation state at the time point and time indicated by the timer information in order to cover the cell area of eNB1 and/or the cell areas of the third eNBs listed in the ES state cell list. Herein, eNB2 may extend coverage by controlling transmission power with a power value indicated by a power parameter (S621).

eNB2, which has transitioned to the ES compensation state, transmits an ES compensate complete indicator message to eNB1 and/or eNB3 in order to indicate that eNB2 is capable of compensating the cell coverage of eNB1 and/or eNB3 by transitioning to the ES compensation state.

The ES compensate complete indicator message may include a message type field (i.e., an indicator indicating the ES compensate complete indicator), a cell ID of a source eNB, a cell ID of a destination eNB, timer information indicating a time point and a time for transitioning to the ES state, and a cell ID of a cell transmitting the ES compensate complete indicator message (i.e., eNB2).

Upon receipt of the ES compensate complete indicator message, eNB1 and/or eNB3 may transmit an ES state transition messages to UEs to which the eNB is a serving cell to indicate that the eNB will transition to the ES state (not shown).

The ES state transition message includes a message type field (an indicator indicating the ES state transition message), timer information indicating a time point and a time for transitioning to the ES state, and a cell list listing ES compensation cells (second eNBs). The ES state transition message may be transmitted by an RRC signal.

Upon receipt of the ES state transition message, a UE may determine that its serving cell (e.g., eNB1 or eNB3) will transition to the ES state. Therefore, the UE may perform handover to an ES compensation cell before elapse of the time point and time indicated by the timer information included in the ES state transition message received from the serving cell.

Also, eNB1 and/or eNB3 that will transition to the ES state may perform a procedure for enabling UEs to which the cell of the eNB is a serving cell to perform handover to the ES compensation cell, before the eNB transitions to the ES state.

Referring to FIG. 6 again, upon receipt of the ES compensate complete indicator message, eNB1 and/or eNB3 may transition to the ES state before expiration of a timer at the time point indicated by the timer information (S625a and S625b).

After completion of transitioning to the ES state, eNB1 and/or eNB3 may transmit to eNB2 as ES compensation cell an ES complete indicator message indicating completion of transitioning to the ES state (not shown).

The ES complete indicator message may include a message type field (i.e., an indicator indicating the ES complete indicator message), a cell ID of a source eNB, and a cell ID of a destination eNB.

According to embodiments of the present invention, cell IDs include a Physical Cell ID (PCID) or a Global Cell ID (GCID). In addition, steps S607 and S609 of FIG. 6 may be optional. If steps S607 and S609 are not performed, one or more second eNBs receiving the ES compensate candidate request message may transmit ES candidate request messages to one or more third eNBs to determine whether there is any more cell to transition to the ES state. For the subsequent operation, steps described in FIG. 6 are referred to.

To determine cells (i.e., second eNBs) that are supposed to transition to the ES compensation state, eNB1 that has determined to transition to the ES state may perform all of the steps illustrated in FIG. 6. However, the overhead of signaling between cells may increase. Moreover, if all of the cells (e.g., the third eNBs) that have determined to enter the ES state perform the operation of FIG. 6, a plurality of ES compensation cells may be determined for each of the cells that have determined to enter the ES state. Further, if ES compensation cells determined by the procedure of FIG. 6 transition to the ES compensation state, that is, the ES compensation cells use high transmission power to extend coverage, inter-cell interference may be increased.

Therefore, timer information may be included in messages transmitted to determine cells that will transition to the ES compensation state (e.g., the ES compensate candidate request message, the ES compensate candidate cell indicator message, and/or the ES candidate request message). It may be regulated that upon receipt of these messages, cells do not perform the afore-described procedure for determining cells that will transition to the ES compensation state from among adjacent cells, even though the cells determine to transition to the ES state until before a time indicated by timer information elapses after receiving the messages.

Figure 7:
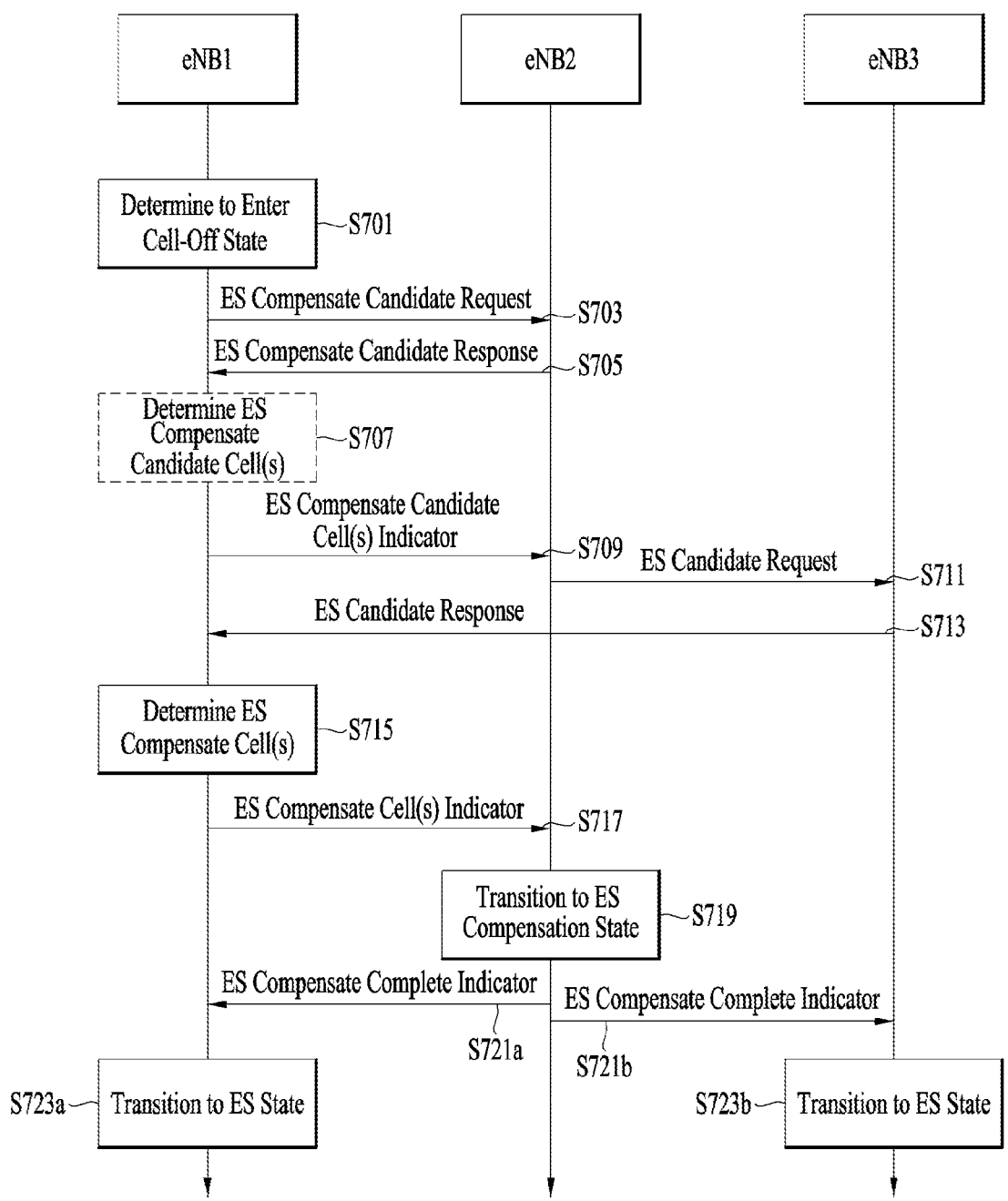
FIG. 7 illustrates another of the methods for determining a compensation cell by an on/off cell, as a one-step power control method.

FIG. 7 illustrates another of the methods for determining a compensation cell by an on/off cell, as a one-step power control method.

FIG. 7 is based on the same basic assumption as FIG. 6. Accordingly, a description will be given of only the difference between FIG. 7 and FIG. 6. That is, a description of steps S701 to S709 is pursuant to the description of steps S601 to S609 of FIG. 6.

eNB2 being an ES compensation cell transmits an ES candidate request message to an adjacent eNB, cells of a small cell cluster to which eNB2 belongs, or predefined small cells of a small cell cluster in order to determine whether the cell(s) will additionally transition to the ES state (S711).

The ES candidate request message may include a type field indicating that this message is an ES candidate request message, a cell ID of a source eNB, a cell ID of a destination eNB, and a cell ID of eNB1 that intends to transition to the ES state.

Upon receipt of the ES candidate request message, one or more third eNBs may determine whether to transition to the ES state based on their load states. For example, eNB3 having a small load equal to or less than a threshold or eNB3 having no load among the third eNBs may transmit an ES candidate response message in response to the ES candidate request message. Herein, eNB3 may determine that eNB1 is a cell determining ES compensation cells and will transition to the ES state, based on the cell ID of eNB1 included in the ES candidate request message. Accordingly, eNB3 may transmit the ES candidate response message to eNB1 (S713).

In another aspect of the present invention, third eNBs that have determined not to transition to the ES state among the third eNBs receiving the ES candidate request message may transmit ES candidate failure messages to eNB1 in step S713.

Each of the ES candidate failure messages may include a message type field (i.e., an indicator indicating that this message is an ES candidate failure message), a cell ID of a source eNB, a cell ID of a destination eNB, and a cell ID of the cell that has transmitted the ES candidate request message, and a cause field indicating an ES failure cause. The cause field may be set to indicate heavy cell load, no capacity for dynamic cell on/off, etc. as causes.

After receiving the ES candidate response message from eNB3, eNB1 may determine eNB2 that will operate as an ES compensation cell within a small cell cluster to which eNB1 belongs (S715).

For details of steps S715 to S713, refer to the description of steps S617 to S625 of FIG. 6.

2.3 Multi-Step Power Control Methods

Figure 8:
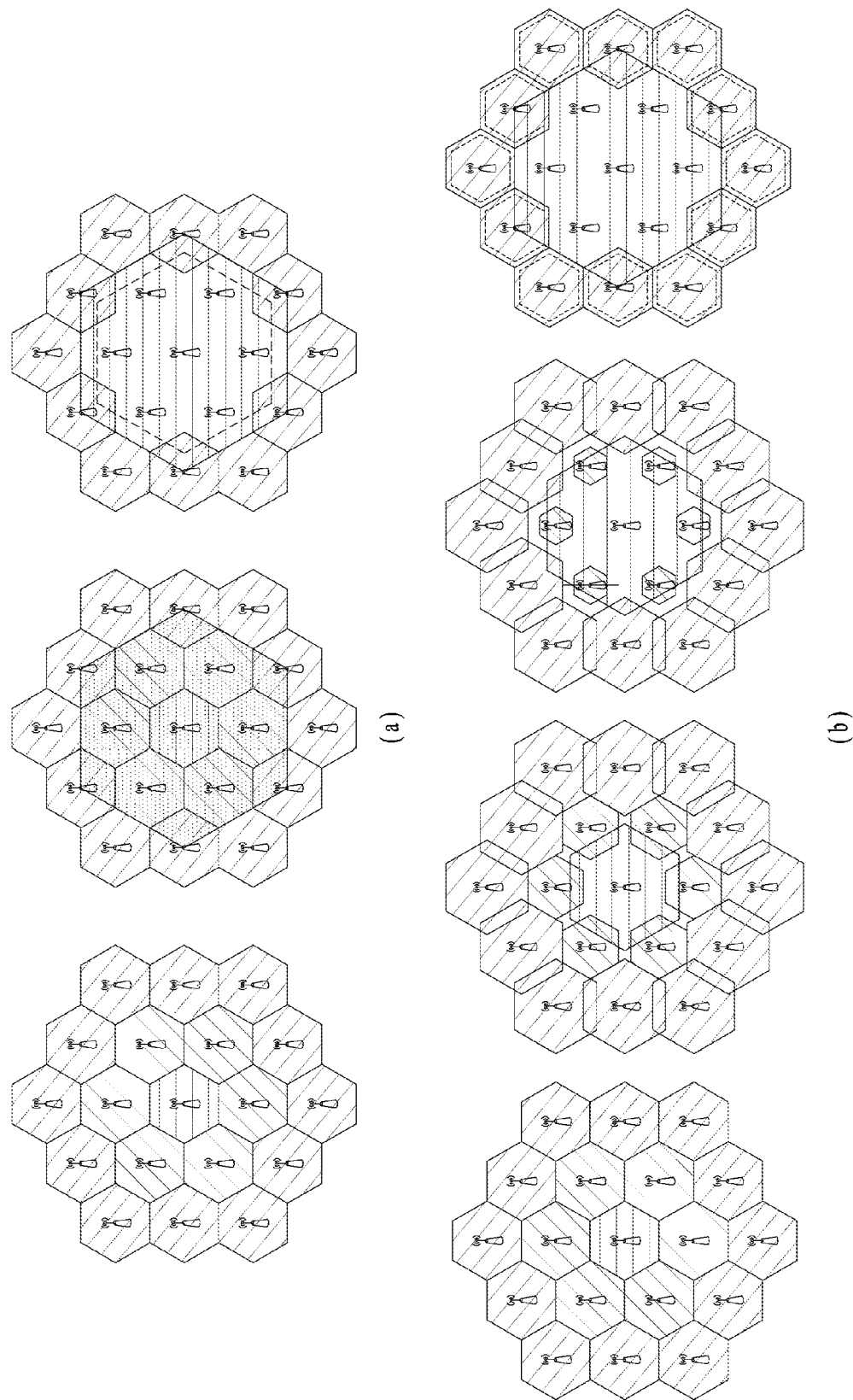
FIG. 8 illustrates exemplary configurations of a small cell cluster.

FIG. 8 illustrates exemplary configurations of a small cell cluster. FIG. 8(a) illustrates a one-step power control procedure and FIG. 8(b) illustrates a multi-step power control procedure.

Referring to FIG. 8(a), it is assumed that a cell at the center is an ES compensation cell and a cell at an intermediate tier is an on/off cell that will enter the ES state. In FIG. 8(a), once an ES compensation cell is determined according to the method described with reference to FIGS. 6 and 7, the ES compensation cell compensates the service area of an existing on/off cell by extending its coverage. Then the on/off cell is immediately powered off and enters the ES state.

In one-step power control, cells that want to transition to the ES state should increase transmission power before transitioning to the ES state, so that compensation cells transitioning to the ES compensation state may cover the whole coverage of the on/off cells that want to transition to the ES state. This operation may cause severe interference with the on/off cells that want to transition to the ES state and their adjacent cells.

Accordingly, this problem may be overcome by controlling a compensation cell transitioning to the ES compensation state and an on/off cell that wants to transition to the ES state to control power in multiple steps. That is, the effects of interference can be mitigated by setting a small coverage area overlapped between the compensation cell and the on/off cell in multiple steps, relative to the one-step power control method.

Referring to FIG. 8(*b*), after an ES compensation cell is determined, an on/off cell may decrease power gradually in a plurality of steps (in three steps in FIG. 8) without immediately being powered off The ES compensation cell may also increase transmission power in a plurality of steps. Herein, cells at the outermost tier may also operate as ES compensation cells. The multi-step power control aims to minimize interference with adjacent eNBs.

However, if the multi-step power control method is used, both the compensation cell transitioning to the ES compensation state and the on/off cell transitioning to the ES state increase and decrease transmission power gradually. Compared to the legacy one-step power control method, therefore, cells neighboring to all of on/off cells transitioning to the ES state may have to transition to the ES compensation state, in order to cover the coverage of the on/off cells.

Therefore, a step for asking whether cells adjacent to the on/off cells transitioning to the ES state are to transition to the ES compensation state may be added, unlike the one-step power control method. In other words, the multi-step power control method may be performed in a similar manner to the one-step power control method except the added step. Herein, the step for asking whether cells adjacent to the on/off cells are to transition to the ES compensation state may be performed before determination of the ES compensation cell. Or the step for asking whether cells adjacent to the on/off cells are to transition to the ES compensation state may be performed after determination of the ES compensation cell.

A description will be given below of a method for controlling power in multiple steps in the procedure for determining an ES compensation cell.

Figure 9:
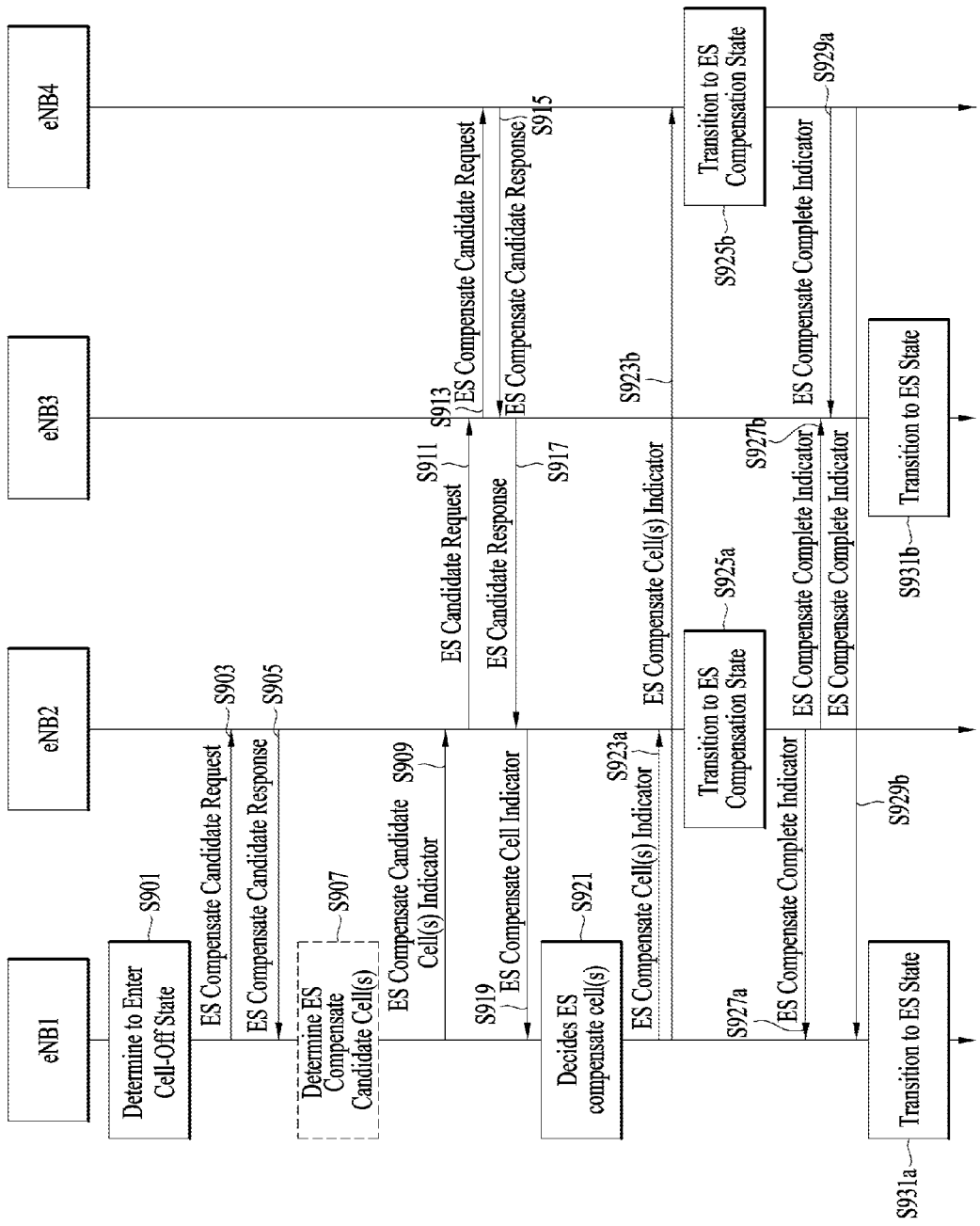
FIG. 9 illustrates one of methods for determining a compensation cell by an on/off cell, as a multi-step power control method.

FIG. 9 illustrates one of methods for determining a compensation cell by an on/off cell, as a multi-step power control method.

In FIG. 9, it is assumed that a first eNB (eNB1) is an on/off cell that will be powered off, and second, third, and fourth eNBs (eNB2, eNB3, and eNB4) form a small cell cluster together with eNB1. That is, eNB2, eNB3, and/or eNB4 may be an ES compensation cell or an on/off cell. While a single second eNB, a single third eNB, and a single fourth eNB are shown in FIG. 9, a plurality of second eNBs, a plurality of third eNBs, and a plurality of fourth eNBs may be used.

Since steps S910 to S911 of FIG. 9 are identical to steps S601 to S611 of FIG. 6, the description of steps S601 to S611 will be referred to for steps S910 to S911.

FIG. 9 is about a method for performing an operation for determining whether an adjacent cell (e.g., eNB4) of an additional cell (e.g., eNB3) transitioning to the ES state before eNB1 being an on/off cell determines an ES compensation cell.

For multi-step power control, a step for determining whether there is a small cell other than eNB2, which may become an ES compensation cell within a small cell cluster may be added to the operation for performing the one-step power control method described before with reference to FIG. 6.

For example, upon receipt of an ES candidate request message in step S911, eNB3 may transmit an ES compensate candidate request message to eNB4 in order to ask whether eNB4 is capable of transitioning to the ES compensation state. Herein, eNB4 may be a neighbor cell, a cell of a small cell cluster to which eNB3 belongs, or a predefined small cell of a small cell cluster (e.g., a cell configured from a microcell) (S913).

If eNB4 is capable of transitioning to the ES compensation state, eNB4 may transmit an ES compensate candidate response message to eNB3, indicating that it is capable of transitioning to the ES compensation state (S915).

The ES compensate candidate request message and the ES compensate candidate response message may be configured in the same formats as the messages used in steps S603 and S605. In addition, steps S917 to S931 may be performed in a similar manner to steps S615 to S625 of FIG. 6. For the convenience of description, only the difference between FIG. 9 and FIG. 6 will be focused on.

eNB3 may transmit to eNB2 an ES candidate response message further including an ES compensation candidate cell list listing fourth eNBs available as ES compensation candidate cells from among one or more fourth eNBs in step S917.

eNB2 may transmit to eNB1 an ES candidate cell indicator message including the ES compensation candidate cell list and an ES state cell list listing third eNBs that want to enter the ES state in step 919.

eNB1 may determine one or more ES compensation cells based on the ES compensation candidate cell list and the ES state cell list in step S921. For example, eNB1 may determine eNB2 and eNB4 which have many cells transitioning to the ES state in their neighborhoods to be ES compensation cells.

Thus, eNB1 transmits an ES compensate cell(s) indicator message to eNB2 and eNB4 to indicate that eNB2 and eNB4 have been determined to be ES compensation cells in steps S923*a* and S923*b*.

eNB1 may also transmit an ES cell(s) indicator message to eNB3 to indicate that eNB3 has been determined to be an ES cell. The ES cell(s) indicator message may include a message type field (i.e., an indicator indicating the ES cell(s) indicator message), a cell ID of a source eNB, and a cell ID of a destination eNB (not shown).

For multi-step power control, eNB1 may determine a power decrement by which its transmission power will be decreased and may further transmit power information about the determined power decrement, power information about power increments by which ES compensation cells will increase their transmission power, and/or a power decrement by which eNB3 should decrease its transmission power as an ES cell to eNB2, eNB3, and eNB4 (not shown).

Upon receipt of the ES compensate cell(s) indicator message, eNB2 and eNB4 may transition to the ES compensation state based on time information included in the message before expiration of a timer (S925*a* and S925*b*).

Upon completion of transitioning to the ES compensation state, eNB2 and eNB4 transmit ES compensate complete indicator messages to eNB1 and/or eNB3.

After receiving the ES compensate complete indicator messages, eNB1 transitions to the ES state (S931*a*). After receiving the ES compensate complete messages from both eNB2 that has transmitted the ES candidate request message and eNB4 that has transmitted the ES compensate candidate request message, eNB3 may transition to the ES state (S931*b*).

Herein, eNB1 and eNB3 may transition to the ES state at time points indicated by timer information included in the ES compensate complete indicator messages before timer expiration.

Before transitioning to the ES state after receiving the ES compensate complete indicator messages, eNB1 and eNB3 may transmit ES state transition messages to UEs to which eNB1 and eNB3 are serving cells (not shown). Each of the ES state transition messages may include a message type field (an indicator indicating the ES state transition message), timer information specifying a time period and a time for transitioning to the ES state, and a compensation cell list listing ES compensation cells.

Upon receipt of an ES state transition message, a UE may determine that its serving cell will transition to the ES state after a time indicated by timer information. Therefore, the UE may perform handover to an ES compensation cell before timer expiration.

Before transitioning to the ES state, the on/off cells that will transition to the ES state (i.e., eNB1 and eNB3) may perform a procedure for allowing UEs to which the cells are serving cells to perform handover to ES compensation cells. Or eNB2 and/or eNB4 that have transitioned to the ES compensation state may transmit an ES compensate complete indicator message to eNB1 and/or eNB3 that have transmitted the ES compensate cell(s) indicator messages (S927a, S927b, S929a, and S929b).

Upon receipt of the ES compensate complete indicator messages, eNB1 and/or eNB3 may transition to the ES state (S931a and S931b).

As described above, a cell that has transmitted an ES compensate candidate request message may determine cells that actually transition to the ES compensation state from among ES compensation candidate cells by acquiring information indicating whether there is a cell that will transition to the ES state among cells adjacent to the ES compensation candidate cells (e.g., neighbor cells, cells of a small cell cluster, or predefined small cells of a small cell cluster).

Figure 10:
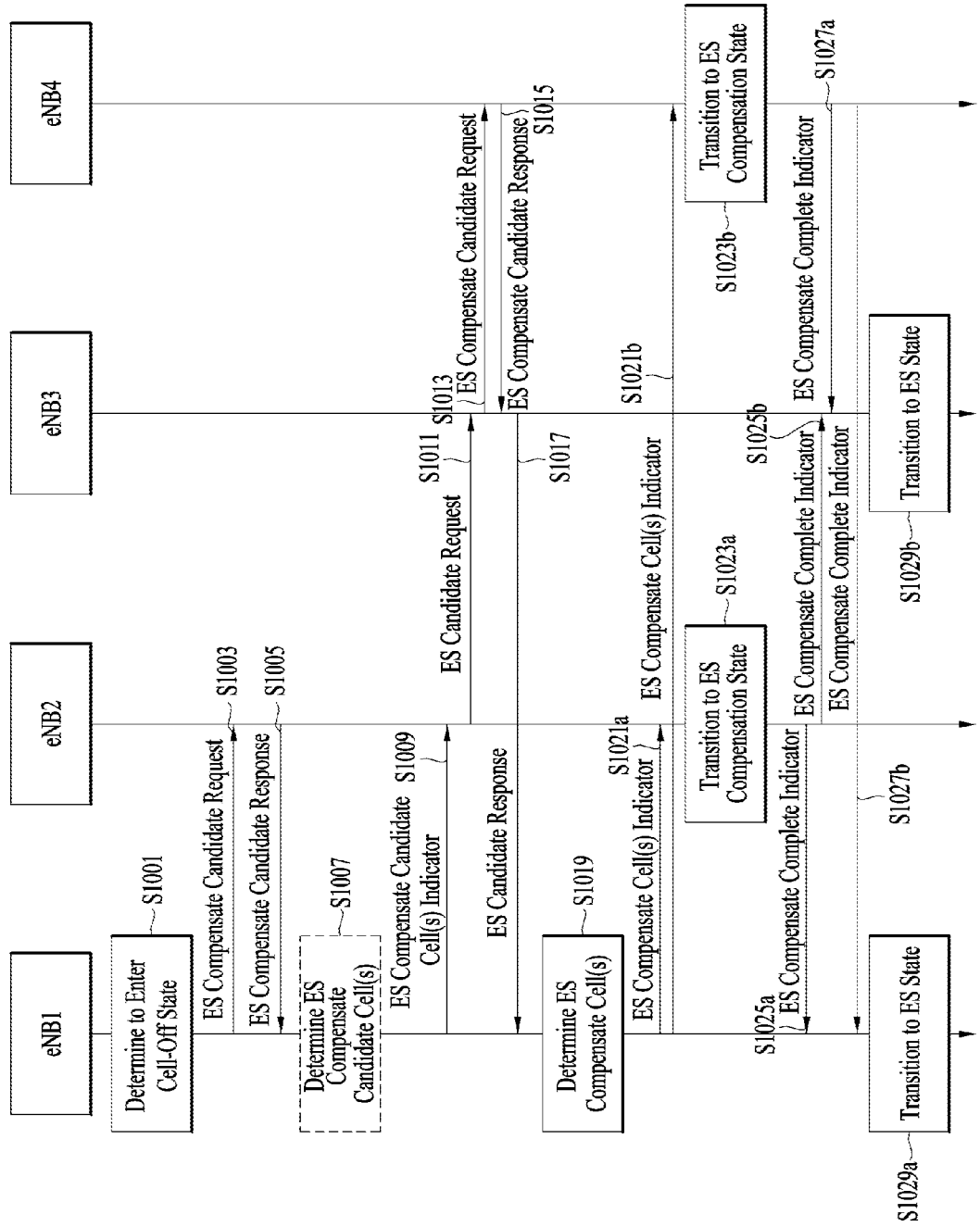
FIG. 10 illustrates another of the methods for determining a compensation cell by an on/off cell, as a multi-step power control method.

FIG. 10 illustrates another of the methods for determining a compensation cell by an on/off cell, as a multi-step power control method.

FIG. 10 is based on the same assumption as FIG. 9. Thus, only the difference between FIG. 10 and FIG. 9 will be described below. Referring to FIG. 10, eNB2 transmits an ES candidate request message to eNB3 in step S1011. The ES candidate request message may include information about eNB1 (i.e., a source eNB) transmitting the ES compensate candidate request message.

Subsequently, eNB3 may transmit an ES compensate candidate request message to a neighbor eNB, a cell of a small cell cluster to which eNB3 belongs, or a cell (i.e., eNB4) selected from among the cells of a small cell cluster by a macro eNB, to thereby ask whether the cell is capable of transitioning to the ES compensation state (S1013).

If eNB4 is capable of transitioning to the ES compensation state, eNB4 may transmit an ES compensate candidate response message to eNB3 (S1015).

Upon receipt of the ES compensate candidate response message, eNB3 may transmit an ES candidate response message directly to eNB1 being an on/off cell. The ES candidate response message may include a compensation cell list listing cells that transition to the ES compensation state from among fourth eNBs (S1017).

Upon receipt of the ES candidate response message, eNB1 may determine ES compensation cells, taking into account the compensation cell list and additional eNBs that will transition to the ES state (S1019).

Subsequently, steps S1021 to 1029 may be performed in the same manner to steps S923 to S931 of FIG. 9. Thus, for steps S1021 to 1029, the description of steps S923 to S931 is referred to.

Figure 11:
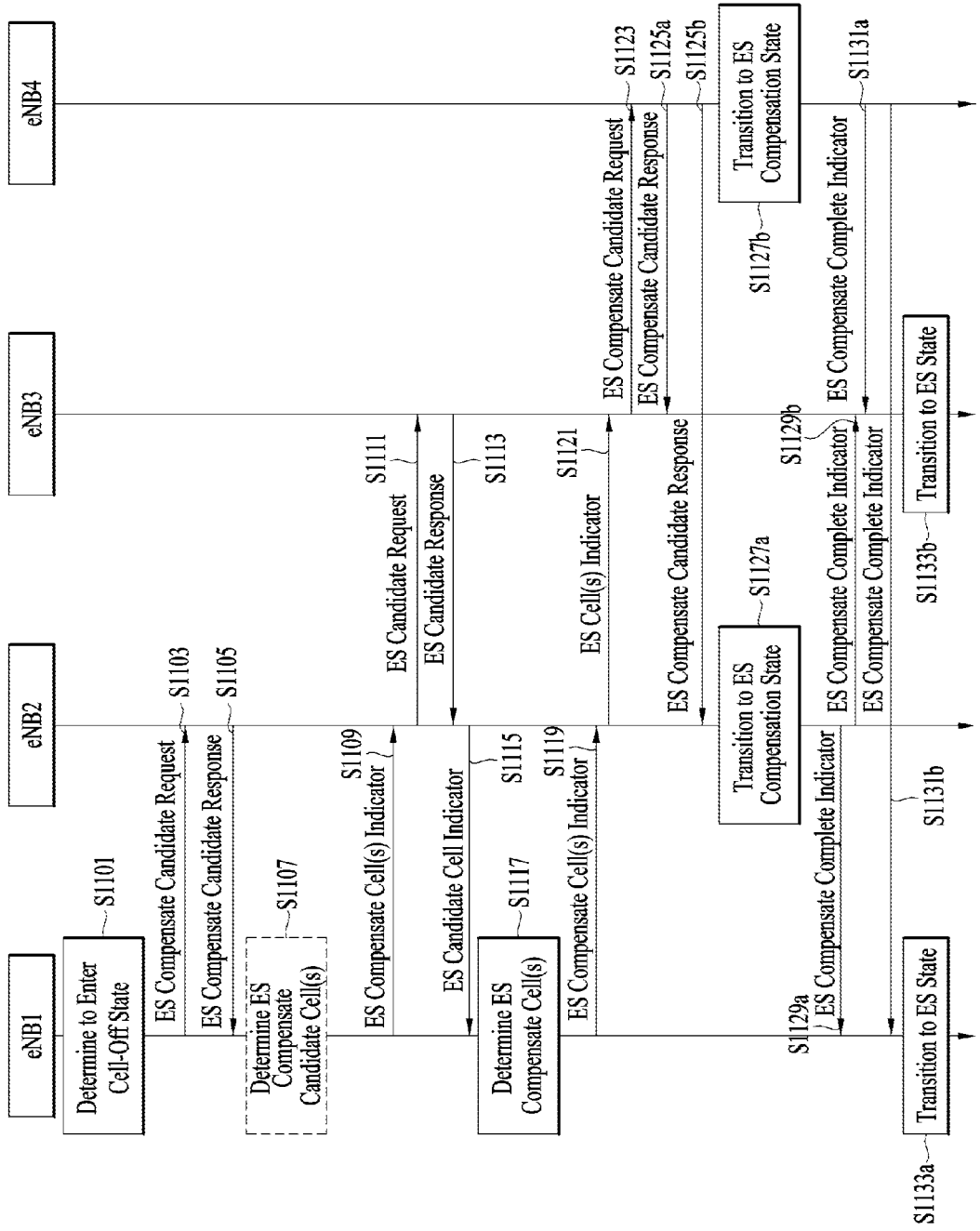
FIG. 11 illustrates another of the methods for determining a compensation cell by an on/off cell, as a multi-step power control method.

FIG. 11 illustrates another of the methods for determining a compensation cell by an on/off cell, as a multi-step power control method.

Particularly, FIG. 11 is about a method for performing an operation for asking whether neighbor cells of cells transitioning to the ES state are to transition to the ES compensation state after eNB1 being an on/off cell determines ES compensation cells.

As an on/off cell, eNB1 may determine compensation cells that are to transition to the ES compensation state in step S1117, after performing steps S1101 to S1115. Steps S1101 to S1117 are identical to steps S601 to S617 of FIG. 6.

Subsequently, eNB1 transmits an ES compensate cell(s) indicator message to one or more second eNBs determined to be ES compensation cells in order to indicate that the second eNBs have been determined to ES compensation cells (S1119).

Upon receipt of the ES compensate cell(s) indicator message, eNB2 transmits an ES cell(s) indicator message to third eNBs that have transmitted ES candidate response messages in step S1113. The ES cell(s) indicator message may include a message type field (an indicator indicating the ES cell indicator message), a cell ID of a source eNB, and a cell ID of a destination eNB (S1121).

Upon receipt of the ES cell(s) indicator message, the third eNBs may be aware that they may transition to the ES state. Therefore, the third eNBs may transmit ES compensate candidate request messages to neighbor cells of the third eNBs, small cells of small cell clusters to which the third eNBs belong, or predefined small cells of small cell clusters in order to determine whether there is any more on/off cell that will transition to the ES compensation state (S1123).

Each of the ES compensate candidate request messages may be configured to include a field indicating the cell ID of eNB2 that has transmitted the ES cell(s) indicator message in the message format described before with reference to FIG. 6.

For multi-step power control, eNB1 may determine a power decrement by which its transmission power will be decreased and may further transmit power information about the determined power decrement, power information about a power increment by which eNB2 will increase its transmission power, and/or a power increment by which eNB3 should increase its transmission power to eNB2. eNB2 may further transmit power information about the power increment of eNB2 or power information about the power increment of eNB3 to eNB3 (not shown).

The ES compensate candidate request message may be configured to further include the cell ID of eNB2 that has transmitted the ES cell(s) indicator message and power information about the power increment by which eNB3 should increase transmission power in the format of an ES compensation candidate request message described before with reference to FIG. 6.

Among one or more fourth eNBs that have received the ES compensate candidate request message, cells capable of transitioning to the ES compensation state may transmit ES compensate candidate response messages to eNB3 that has transmitted the ES compensate candidate request message and/or eNB2 that has transmitted the ES cell(s) indicator message (S1125a and S1125b).

After receiving an ES compensate candidate response message from eNB4 additionally transitioning to the ES compensation state for multi-step power control, eNB2 determined to be a compensation cell may transition to the ES compensation state (S1127a).

eNB4 also transitions to the ES compensation state after transmitting an ES compensate candidate response message to eNB2 and eNB3 (S1127b).

eNB2 and eNB4 that have transitioned to the ES compensation state may indicate that they have transitioned to the ES compensation state by transmitting ES compensate complete indicator messages to eNB1 and eNB3 being on/off cells that will transition to the ES state (S1129a, S1129b, S1131a, and S1131b).

After receiving the ES compensate complete messages from eNB2 and eNB4 that have transitioned to the ES compensation state, eNB1 that has transmitted the ES compensate cell(s) indicator message transitions to the ES state (S1133a).

eNB3 which has received the ES candidate request message may transition to the ES state after receiving the ES compensate complete indicator messages from both eNB2 that has transmitted the ES candidate request message and the fourth eNBs that have transmitted the ES compensate candidate response messages (S1133b).

Before transitioning to the ES state, eNB1 and eNB3 that have received the ES compensate complete indicator message may transmit ES state transition messages to UEs to which eNB1 and eNB3 are serving cells (not shown).

Each of the ES state transition messages may include a message type field (an indicator indicating the ES state transition message), timer information specifying an ES state transition time point, and a cell list listing one or more ES compensation cells. The ES state transition message may be transmitted by an RRC signal.

Upon receipt of an ES state transition message, a UE may determine that its serving cell eNB1 and/or eNB3 will be powered off after a time point indicated by timer information and thus the UE should perform handover from the serving cell to an ES compensation cell. Before transitioning to the ES state, eNB1 and eNB3 may command handover to an ES compensation cell to UEs to which they are serving cells.

In FIG. 11, eNB3 that has transmitted an ES compensate candidate request message may acquire information indicating whether there is a cell that is to transition to the ES state among cells adjacent to ES compensate candidate cells (e.g., neighbor cells, cells of a small cell cluster to which eNB3 belongs, or predefined small cells of a small cell cluster). Thus, eNB3 may implement the afore-described embodiments of the present invention to determine cells that are actually to transition to the ES compensation state among ES compensation candidate cells.

Figure 12:
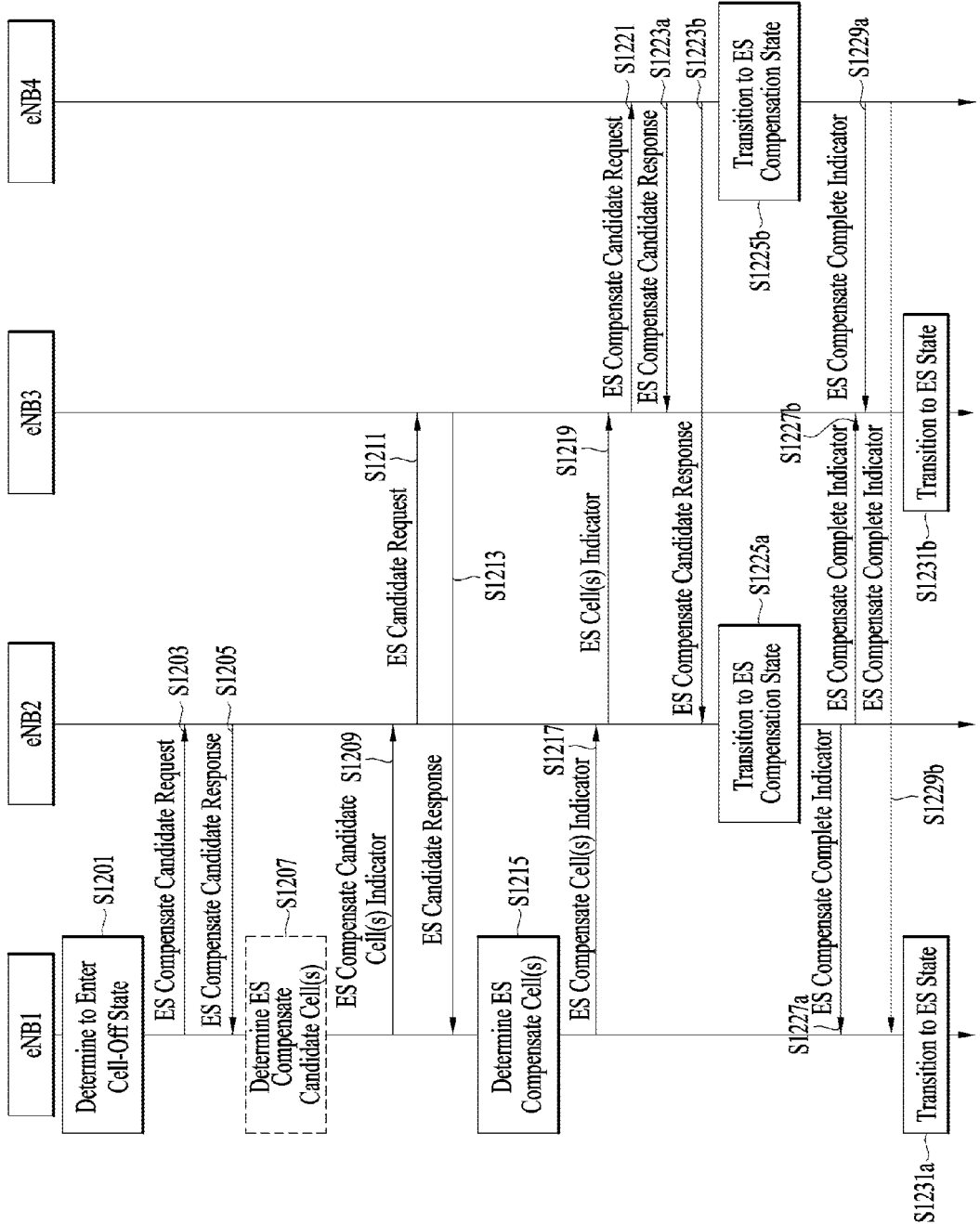
FIG. 12 illustrates another of the methods for determining a compensation cell by an on/off cell, as a multi-step power control method.

FIG. 12 illustrates another of the methods for determining a compensation cell by an on/off cell, as a multi-step power control method.

FIG. 12 is based on the same assumption as FIG. 11. Thus, only the difference between FIG. 12 and FIG. 11 will be described below. Referring to FIG. 12, eNB2 transmits an ES candidate request message to eNB3 to determine whether there is any more on/off cell that will transition to the ES state around eNB2 in step S1211. The ES candidate request message may include information about eNB1 (i.e., a source eNB) that has transmitted an ES compensate candidate request message.

Subsequently, if eNB3 determines to transition to the ES state, eNB3 transmits an ES candidate response message to eNB1 in step S1213. On the other hand, if eNB3 determines not to transition to the ES state, eNB3 transmits an ES candidate failure message to eNB1 in step S1213.

Subsequently, steps S1215 to 1231 may be performed in the same manner to steps S1117 to S1133 of FIG. 11. Thus, for steps S1215 to 1231, the description of steps S1117 to S1133 is referred to.

3. Implementation Apparatuses

The apparatus described with reference to FIG. 13 can implement the methods described in FIGS. 1 to 12.

A UE may operate as a transmitter in uplink and operate as a receiver in downlink. In addition, a BS (eNB) may operate a receiver in uplink and operate as a transmitter in downlink.

That is, the UE and the BS may respectively include transmitter 1340 and 1350 and receiver 1360 and 1370, in order to control transmission and reception of information, data and/or message. The UE and the BS may include antennas 1300 and 1310 for transmitting/receiving information, data and/or messages, respectively.

The UE and the BS may include processors 1320 and 1330 for performing the above-described embodiments of the present invention and memories 1380 and 1390 for temporarily or permanently storing processing procedures of the processors, respectively.

The embodiments of the present invention may be implemented using the components and functions of the UE apparatus and the BS apparatus. For example, the processor of the BS may determine an ES compensation cell in a combination of the methods disclosed in Clauses 1 and 2. The ES compensation cell may perform an operation for determining whether there is any more small cell that will transition to the ES state in an adjacent BS. If multi-step power control is performed, the BS may additionally perform an operation for determining whether there is an additional small cell that will transition to the ES compensation state among adjacent small cells.

Figure 13:
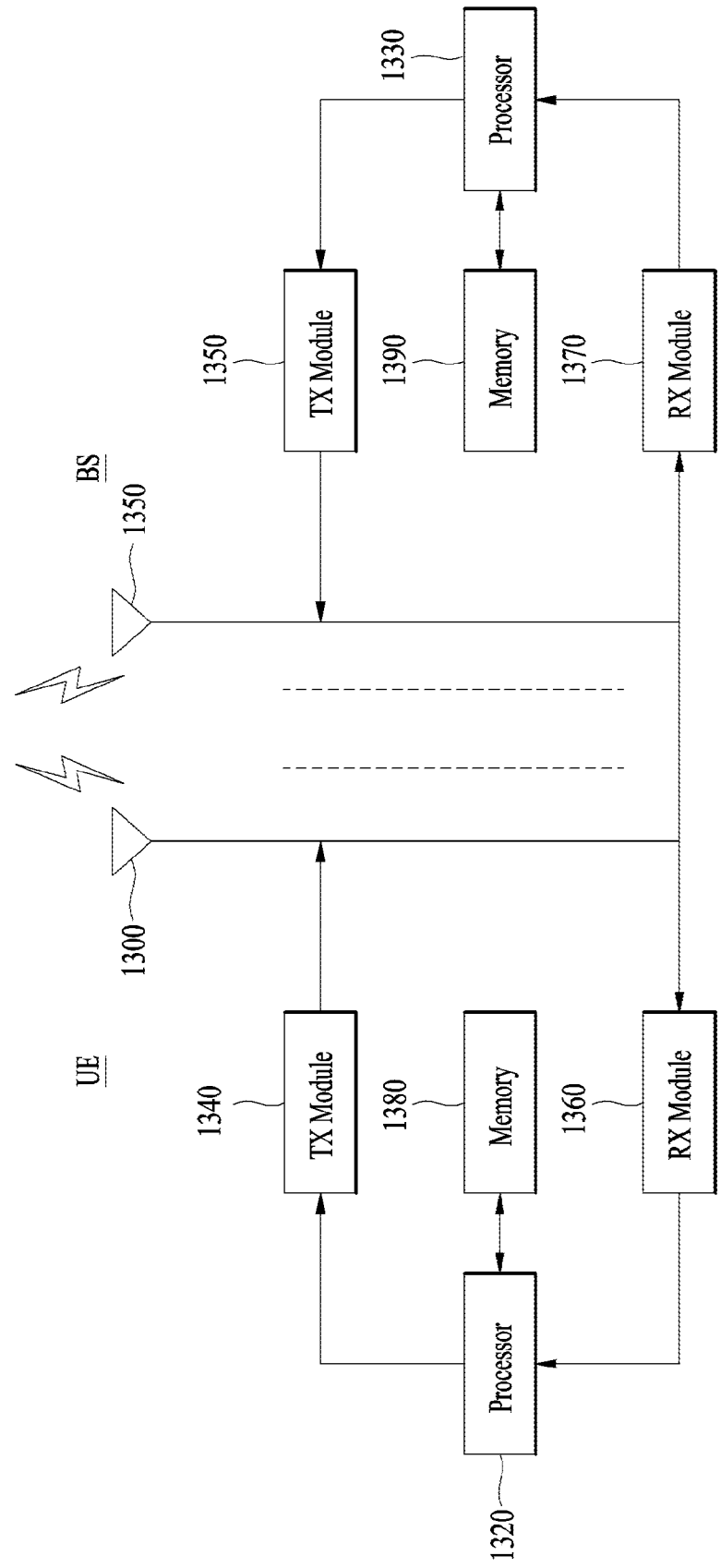
FIG. 13 is a block diagram of apparatuses for implementing the methods described in FIGS. 1 to 12.

While the configurations of the UE apparatus and the BS apparatus are shown in FIG. 13, the apparatus configurations may be used as apparatus configurations between BSs. Particularly, since the embodiments of the present invention provide a method for determining an ES compensation cell between BSs, they may be implemented between two or more BSs. For details, the embodiments described before with reference to FIGS. 6 to 12 are referred to.

The transmitter and the receiver included in the UE and the BS may perform a packet modulation/demodulation function for data transmission, a high-speed packet channel coding function, an orthogonal frequency division multiple access (OFDMA) packet scheduling function, a time division duplexing (TDD) packet scheduling function and/or a channel multiplexing function. The UE and the BS of FIG. 22 may further include a low-power radio frequency (RF)/Intermediate frequency (IF) module.

Meanwhile, in the present invention, as a UE, a personal digital assistant (PDA), a cellular phone, a personal communication service (PCS) phone, a global system for mobile (GSM) phone, a wideband CDMA (WCDMA) phone, a mobile broadband system (MBS) phone, a handheld personal computer (PC), a laptop, a smart phone or a multi mode-multi band (MM-MB) terminal may be used.

The smart phone refers to a terminal which has merits of a mobile communication terminal and a PDA and includes a data communication function of the PDA, such as scheduling, fax transmission/reception and Internet access, as well as the functions of the mobile communication terminal In addition, the MM-MB terminal refers to a terminal which may include a multi-modem chip and operate in a portable Internet system and other mobile communication systems (e.g., a Code Division Multiple Access (CDMA) 2000 system, a Wideband CDMA (WCDMA) system, etc.).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in the memory units 1380 and 1390 so that it can be driven by the processors 1320 and 1330. The memory units are located inside or outside of the processors, so that it can communicate with the aforementioned processor via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The embodiments of the present invention are applicable to various wireless access systems.

What is claimed is:

1. A method for determining an Energy Saving (ES) compensation cell in a wireless access system, the method comprising:
   transmitting, by a first base station (BS) to a plurality of second BSs, an ES compensate candidate request message to determine whether each of the plurality of second BSs is capable of transitioning to an ES compensation state;
   receiving, by the first BS from each of the plurality of second BSs, an ES compensate candidate response message indicating that each of the plurality of second BSs is to transition to the ES compensation state;
   receiving, by the first BS from each of the plurality of second BSs, an ES candidate cell indicator message including information about third BSs that are to additionally transition to an ES state; and
   determining, by the first BS, the ES compensation cell among the plurality of second BSs based on each of the ES compensate candidate response messages and the information about the third BSs,
   wherein the ES compensation cell is one of the plurality of second BSs which has most third BSs that intend to transition to the ES state, and
   wherein the first BS and the third BSs are on-off cells that are to transition to the ES state, and one of the plurality of the second BSs is the ES compensation cell.

2. The method according to claim 1, further comprising:
   transmitting, by the first BS, an ES compensate cell indicator message including timer information indicating an ES compensate state transition time point to indicate the determined ES compensation cell, a power parameter required for power control of the ES compensation cell and a ES state cell list listing one or more of the third BSs;
   receiving, by the first BS from the ES compensation cell, an ES compensate complete indicator message indicating completion of transitioning to the ES compensation state; and
   transitioning, by the first BS, to the ES state after receiving the ES compensate complete indicator message.

3. The method according to claim 2, wherein the ES compensate complete indicator message includes the timer information indicating an ES state transition time point, and the first BS transitions to the ES state before expiration of the timer information.

4. The method according to claim 2, further comprising:
   transmitting, by the first BS, an ES state transition message commanding one or more User Equipments (UEs) within a cell area of the first BS to perform handover to the ES compensation cell after receiving the ES compensate complete indicator message.

5. method according to claim 2, wherein the ES candidate cell indicator message further includes an ES compensation cell list listing one or more fourth BSs that are additionally to transition to the ES compensation state, and the first BS determines the ES compensation cell based on the ES state cell list and the ES compensation cell list.

6. The method according to claim 5, wherein the first BS, the plurality of second BSs, the third BSs, and the one or more fourth BSs are small cells included in one small cell cluster.

7. The method according to claim 5, wherein the plurality of second BSs are BSs adjacent to the first BS, the third BSs are BSs adjacent to the plurality of second BSs, and the one or more fourth BSs are BSs adjacent to the third BSs.

8. A first Base Station (BS) for determining an Energy Saving (ES) compensation cell in a wireless access system, the first BS comprising:
   a transmitter;
   a receiver; and
   a processor configured to determine the ES compensation cell,
   wherein the processor is configured to:
   transmit an ES compensate candidate request message to a plurality of second BSs to determine whether each of the second BSs is capable of transitioning to an ES compensation state by controlling the transmitter,
   receive from each of the plurality of second BSs an ES compensate candidate response message indicating that each of the plurality of second BSs is to transition to the ES compensation state by controlling the receiver,
   receive from each of the plurality of second BSs an ES candidate cell indicator message including information about third BSs that are to additionally transition to an ES state by controlling the receiver, and
   determine the ES compensation cell among the plurality of second BSs based on each of the ES compensate candidate response messages and information about the third BSs, wherein the ES compensation cell is one of the plurality of second BSs which has most third BSs that intend to transition to the ES state, and wherein the first BS and the third BSs are on-off cells that are to transition to the ES state, and one of the plurality of the second BSs is the ES compensation cell.

9. The first BS according to claim 8, wherein the processor is further configured to:

transmit an ES compensate cell indicator message including timer information indicating an ES compensate state transition time point to indicate the determined ES compensation cell by controlling the transmitter, a power parameter required for power control of the ES compensation cell and a ES state cell list listing one or more of the third BSs, and receive from the ES compensation cell an ES compensate complete indicator message indicating completion of transitioning to the ES compensation state by controlling the receiver, and wherein the first BS transitions to the ES state after receiving the ES compensate complete indicator message.

10. The first BS according to claim 9, wherein the ES compensate complete indicator message includes the timer information indicating an ES state transition time point, and the first BS transitions to the ES state before expiration of the timer information.

11. The first BS according to claim 9, wherein the processor is configured to transmit an ES state transition message commanding one or more User Equipments (UEs) within a cell area of the first BS to perform handover to the ES compensation cell after receiving the ES compensate complete indicator message.

12. The first BS according to claim 9, wherein the ES candidate cell indicator message further includes an ES compensation cell list listing one or more fourth BSs that are additionally to transition to the ES compensation state, and the first BS determines the ES compensation cell based on the ES state cell list and the ES compensation cell list.

13. The first BS according to claim 12, wherein the first BS, the plurality of second BSs, the third BSs, and the one or more fourth BSs are small cells included in one small cell cluster.

14. The first BS according to claim 12, wherein the plurality of second BSs are BSs adjacent to the first BS, the third BSs are BSs adjacent to the plurality of second BSs, and the one or more fourth BSs are BSs adjacent to the third BSs.

* * * * *